United States Patent

Nemphos et al.

Patent Number: 5,384,879
Date of Patent: Jan. 24, 1995

[54] CABLE JACKETING

[75] Inventors: Speros P. Nemphos, Clinton; Stanley F. Bedell, Andover, both of Mass.

[73] Assignee: Camelot Technologies, Inc., Leominster, Mass.

[21] Appl. No.: 965,619

[22] Filed: Oct. 22, 1992

Related U.S. Application Data

[62] Division of Ser. No. 769,396, Oct. 1, 1991, abandoned.

[51] Int. Cl.$^6$ ............................. G02B 6/36; G02B 6/00
[52] U.S. Cl. ............................. 385/100; 174/120 AR; 174/121 AR; 385/147; 428/286
[58] Field of Search ................. 428/286, 287, 327; 385/100, 145, 147; 174/120 AR, 121 AR, 110 AR

[56] References Cited

U.S. PATENT DOCUMENTS

| | | | |
|---|---|---|---|
| 2,604,461 | 7/1952 | Roth | 525/333.5 |
| 2,733,231 | 1/1956 | Bauman | 525/333.5 |
| 3,336,271 | 8/1957 | Durocher | 525/333.5 |
| 3,670,731 | 6/1972 | Harmon | 525/333.5 |
| 5,190,815 | 3/1993 | Kobayashi | 428/335 |

FOREIGN PATENT DOCUMENTS

| | | |
|---|---|---|
| 0335410 | 10/1989 | European Pat. Off. . |
| 860636 | 3/1986 | Greece . |

*Primary Examiner*—Christopher Henderson
*Attorney, Agent, or Firm*—Stevens, Davis, Miller & Mosher

[57] ABSTRACT

Lightly crosslinked aromatic polymers are suitable in water sealing applications such as geomembranes used around building sub structures and also in cable jacketing to protect submarine cables from moisture intrusion.

2 Claims, No Drawings

CABLE JACKETING

This application is a divisional of patent application Ser. No. 07/769,396, filed Oct. 1, 1991, now abandoned.

FIELD OF THE INVENTION

The present invention relates to lightly crosslinked polymers which are highly swellable in water or dilute salt solutions, such as sea water, which polymers have a rapid swell rate. Such polymers may be used in water blockings applications. Particularly, the polymers may be used in cable jacketing applications such as electronic cables or fibre optics cables.

BACKGROUND OF THE INVENTION

It is known to use water swellable polymers in water sealing applications. Generally such polymers are acrylics. That is they are based on or have a significant proportion (e.g. greater than about 60%) of a monomer such as acrylic acid or methacrylic acid. The use of these polymers is analogous to the use of swellable rubber around the wing tanks of fighter aircraft in the second world war. That is the polymer was placed on the "dry" side of a barrier. If the barrier becomes broken or ruptured, the polymer rapidly takes up the water and seals the rupture or break in the barrier. These types of barriers are important in many applications from the mundane such as barriers around substructures which extend below the water table such as the foundations and basements of buildings and/or tunnels etc. to the more exotic such as sealing means to prevent the intrusion of water into fibre optics cables.

The polymers of the present invention are not acrylic polymers. Rather, the polymers are sulphonated (vinyl) aromatic polymers.

European Patent 0 335 410 published Apr. 10, 1989 in the name of Takizawa et al, assigned to Dainichiseika Color & Chemicals Mfg. Co., Ltd. discloses the use of a water swellable polymer of hydrophobic chains having an $\alpha,\beta$-ethylenic unsaturation at the end of the chain and a monomer of (meth) acrylic acid. As noted above, the polymers of the present invention do not contain significant, if any, (meth acrylic acid. Additionally, the polymers of the present invention have a backbone which is initially hydrophobic but which is sulphonated and becomes hydrophylic. Thus, the polymers of the present invention are distinct over the polymers taught in EP 0 335 410.

The present invention seeks to provide a novel absorbent water block material comprising the class of sulphonated vinyl aromatic polymers and their use in water blocking applications. The polymers should have a swell rate so that the polymers double their volume in water or dilute salt solutions, such as sea water, in less than about 30 seconds when contacted with an equal or excess weight of water or 3% NaCl.

SUMMARY OF THE INVENTION

Accordingly the present invention provides an absorbent water block material comprising a sulphonated lightly crosslinked aromatic polymer in particulate form having a particle size such that the particles will pass through a 40 mesh sieve, a bulk density of not more than 0.8 g/cc, a water absorbency of not less than 150 g of water per gram of polymer determined by the ratio of the weight of polymer swollen with water for at least three minutes to the weight of dry polymer before contact with water, which polymer has a swell rate so that it will swell to twice its volume in both water and a 3% solution of NaCl in less than 30 seconds as determined by placing a sample of polymer in a half inch diameter test tube, the weight of sample being selected so that in view of the bulk density of the polymer the ratio of the diameter of the test tube to the height of sample of dry polymer is at least two to one, and introducing at least twice the weight of polymer of liquid and measuring the time for the volume of the polymer to double.

The present invention also provides a multi-layered web comprising a backing web, a face web and between said backing web and said face web, a layer of an absorbent water block polymer as described above.

In a preferred embodiment the present invention provides a cable for use in wet environments comprising a jacket and one or more inner core components and at least one wrap or partial wrap of a web as described above.

DETAILED DESCRIPTION

As used in the present specification the term swell rate means the time it takes for a sample of polymer to swell to twice its original volume when contacted with an excess (e.g. at least about twice its weight) of water and/or 3% NaCl. The swell rate may be measured as described above. (It is also possible to place the sample of polymer in a fine woven web or net such as a piece of nylon stocking or the like, provided the woven web or net has sufficient expansion so as to not unduly constrain the expansion of polymer. The primary purpose of the screen or web is to keep the polymer in a relatively coherent configuration when contacted with the water so that the polymer is not significantly disturbed by the addition of the water. This is similar in some sense to the actual use of the polymer as generally it will be constrained against free movement. Such a free movement of the polymer may to some extent give a false swell rate as grains of polymer may float up into the water phase and become rapidly swollen. It is interesting to note that in some circumstances the particle size of the polymer may be selected so that there is very rapid surface swelling and low penetration of the water into the bulk of the polymer (i.e. blocking). This also gives erroneous results as in such cases the surface of the polymer swells and effectively prevents the water from reaching the inner or lower surfaces of the polymer, in such cases the polymer completely effectively seals the inner areas of the polymer from the water and a layer of water may be retained above the sample of polymer. This is why it is necessary to have a ratio of diameter of contain and height of sample of at least 2:1.

Vinyl polymers useful in accordance with the present invention typically contain aromatic rings. Preferred polymers are styrenic in nature. The polymers may be prepared in accordance with the teachings of the Greek Patent 86.0636 by dissolving polystyrene in a polar organic solvent then reacting the resulting solution with a dialkylhalo aromatic compound in the presence of a Lewis Acid such as $SbCl_5$, $FeCl_3$ and $ZnCl_2$, preferably, $SbCl_5$. The details of the process are disclosed in the literature. (e.g. "Crosslinking of Polystyrene by Mono- and Difunctional Agents", Nikolaos A. Peppas and George N. Valkanas, Makromolekulare Chemie 62 (1977) 163; and "Friedal-Crafts Crosslinking of Polystyrene", N. Grassie and J. Gilks, Journal of Polymer Science: *Polymer Chemistry Edition*, Vol. 11, 1531–1552.

Polymers produced by such a process may be characterized as comprising polymers of $C_{8-2}$ vinyl aromatic monomers and optionally minor amounts of non-aromatic copolymerizable vinyl monomers well known to those skilled in the art of styrenic copolymer technology which have been crosslinked with a $C_{6-10}$ aromatic compound which is substituted by at least two $C_{1-4}$ alkyl radicals which are substituted by at least one halogen atom, which aromatic compound may be further substituted by up to two $C_{1-4}$ alkyl radicals, in the presence of a Lewis acid. Useful Lewis acids include $SbCl_5$, $FeClhd 3$, $2Cl_2$ and $SnCl_4$. Typically the aromatic compound is a benzene compound. The alkyl groups are generally $C_{1-4}$ alkyl radicals which are halogenated. Preferably the halogen atom is a chlorine atom. The aromatic compound may be further substituted by up to two $C_{1-4}$ alkyl radicals. Useful dialkyl halo aromatic compounds include 1,4-dichloromethyl benzene and 2,5-dimethyl-1, 4-dichloromethyl benzene. (Also referred to as 2,5 bis(chloromethyl)-p-xylene).

It is also possible to produce crosslinked vinyl aromatic polymers by the direct polymerization of a monomer mixture comprising essentially one or more monovinyl aromatic monomers and one or more poly- or di-vinyl aromatic monomers. The system which is most well known is the production of crosslinked polystyrene by polymerizing styrene and a small amount of divinyl benzene or its analogues such as diisopropenyl benzene etc., or other crosslinking agents such as ethylene glycol dimethacryiate (EGDM) or PEGDM etc. Typically the ratio of styrene to divinyl benzene will be from 97:3 to 99.95:0.05 preferably from 98:2 to 99.95:0.05, most preferably from 99:1 to 99.95:0.05.

Such polymers might be characterized as copolymers comprising from 97 to 99.95 most preferably from 98 to 99.95 weight % of one or more $C_{8-12}$ vinyl aromatic monomers which are unsubstituted or substituted by a $C_{1-4}$ alkyl radical or a chlorine atom and from 3, most preferably from 2 to 0.05 weight % of a divinyl aromatic monomer, or other known crosslinking agents.

It is pointed out in Greek Patent 86.0636 that other aromatic containing polymers, in addition to homopolymers of $C_{8-12}$ vinyl aromatic monomers, may be crosslinked using a Lewis Acid in the presence of a dialkyl-halo aromatic reactant. Suitable other polymers may include:

(a) copolymers comprising copolymer comprising from 10 to 40 weight % of a copolymer comprising 40 to 60 weight % of one or more C8–12 vinyl aromatic monomers which are unsubstituted or substituted by a $C_{1-4}$ alkyl radical or a chlorine atom and from 60 to 40 weight % of one or more $C_{3-8}$ vinyl nitriles which have been grafted onto from 90 to 60 weight % of a homopolymer of one or more $C_{4-6}$ conjugated diolefins; and (b) copolymers comprising from 40 to 60 weight % of one or more $C_{8-12}$ vinyl aromatic monomers which are unsubstituted or substituted by a $C_{1-4}$ alkyl radical or a chlorine atom and from 60 to 40 weight % of one or more $C_{4-6}$ conjugated diolefins.

Although the discussion of aromatic monomers has centered on styrene which is preferred, suitable vinyl aromatic monomers which are useful in accordance with the present invention include $C_{8-12}$ vinyl aromatic monomers which are unsubstituted or substituted by a $C_{1-4}$ alkyl radical or a chlorine atom. Such monomers include styrene, α-methyl styrene and chlorostyrene.

Suitable $C_{3-8}$ alkenyl nitriles include acrylonitrile and methacrylonitrile.

Suitable polymers of $C_{4-6}$ conjugated diolefins include homopolymers of butadiene or copolymers of butadiene one or more of isoprene, styrene or acrylonitrile. Thus a suitable polymer for use in accordance with the present invention is ABS.

The polymers useful in accordance with the present invention may be a copolymer of a vinyl aromatic monomer as discussed above with a conjugated diolefin as discussed above. One such polymer is styrene butadiene rubber.

The crosslinked polymer is one in which the crosslink density is such that the molecular weight of the polymer chain between crosslinks is from 10,000 to 50,0000, preferably from 15,000 to 50,000 most preferably from 30,000 to 50,000. The method for determining the molecular weight of the polymer chain between crosslinks is discussed in the paper "Physical Characterization of Suspension Crosslinked Polystyrene Particles and Their Sulphonated Products": Nonionic Networks, F.P. Regas and G. N. Valkanas; POLYMER, 1984, Vol 25, February 245, the text of which is hereby incorporated by reference.

If the crosslinking agent is copolymerized with the vinyl aromatic compound a suitable polymerization method is suspension polymerization. Such a process is well known to those skilled in the art and is disclosed in well known texts such as that by Boundy and Boyer relating to styrene polymerization.

After crosslinking or polymerization the polymer may then be sulphonated. Typically the polymer is swollen with an organic solvent such as a halogenated alkane, such as dichloro ethane. The swollen polymer may then be treated with a suitable sulphonating agent or system. Suitable sulphonating systems include: treatment with one or more agents selected from the group consisting of sulphuric acid, chlorosulphonic acid and sulphur trioxide. It should be noted that these reagents may further crosslink the polymer. Generally it is desirable to carry out such treatments at lower temperatures to avoid further crosslinking. A particularly suitable process consists of treating the crosslinked polymer with a complex of sulphur trioxide in the presence of a tri-alkyl phosphate. Such a process is more fully described in applicants copending U.S. patent application Ser. No. 647,981 filed Jan. 30, 1991, now U.S. Patent No. 5,280,082 issued January 18, 1994.

In a particularly preferred process of sulphonating the polymers of the present invention the crosslinked polymer is first swollen in an organic solvent at temperature and pressure conditions such that the organic solvent remains a liquid at the temperature of treatment. Typically the temperature is from room temperature up to about 70° C. Preferred solvents are halogenated $C_{1-8}$ alkanes. Particularly useful solvents include dichloroethane, dichloromethane and 1,1,1-trichloroethane.

After the crosslinked polymer is swollen in the solvent the resulting swollen crosslinked vinyl aromatic polymer may optionally be separated from excess solvent. This treatment may be a simple procedure such as decanting the excess solvent or filtering the swollen crosslinked vinyl aromatic polymer from the solvent. However, other more sophisticated methods may be used to separate the swollen crosslinked vinyl aromatic polymer from the solvent such as centrifuging.

The resulting swollen crosslinked vinyl aromatic polymer may then be treated with a sulphonating system such as sulphuric acid, oleum or sulphur trioxide per se or in combination with agents to help control the sulphonation process. A suitable system is a mixture comprising a trialkyl phosphate and sulphur trioxide in a molar ratio from 1:1 to 1:4. Preferably the molar ratio of trialkyl phosphate to sulphur trioxide is from 1:2 to 1:3. The mole ratio of sulphur trioxide to crosslinked vinyl aromatic polymer to the mix is from 1:5 to 1:0.5 preferably about 1:1.

Suitable trialkyl phosphates include tri-$C_{1-4}$ alkyl phosphates. A particularly useful trialkyl phosphate is triethyl phosphate.

Sulphur trioxide is a liquid at temperatures up to about 45° C. and has a density of about 1.9 g/cc. The sulphur trioxide may be used in the form of a solution dissolved in the organic solvent or an organic solvent soluble in or miscible with the organic solvent. The $SO_3$ may be used as 100% (pure $SO_3$) or obtained from an $SO_3$ generator or donor such as oleum. If oleum is used as a generator or donor it is mixed with the solvent and the excess sulphuric acid is separated from the oleum solvent mixture prior to the formation of the $SO_3$-trialkyl phosphate mixture or complex (e.g. the trialkyl phosphate is added to the solution after separation of the $H_2SO_4$). It is believed that the $SO_3$ and trialkyl phosphate form a complex.

The swollen crosslinked vinyl aromatic polymer is treated with the mixture or complex of trialkyl phosphate and sulphur trioxide for a period of time from ten minutes to about five hours, preferably from about thirty minutes to about two hours at a temperature from 30° C. to 65° C. preferably from about 30° C. up to 55° C. most preferably from 30° C. to 45° C. Typically the swollen crosslinked vinyl aromatic polymer is added to the trialkyl phosphate and $SO_3$ or a solution of the trialkyl phosphate and $SO_3$. As the polymer is sulphonated it precipitates from the reaction mixture.

After the sulphonation the crosslinked polymer may be separated from the solution of organic solvent and trialkyl phosphate/sulphur trioxide mixture by relatively simple means such as filtering. From a commercial point of view the solvent is recycled to minimize operating costs.

Normally the resulting sulphonated polymer is neutralized with a fixed base such as alkali such as a hydroxide of a Group I metal, preferably sodium hydroxide in an alcoholic medium generally comprising a $C_{1-4}$ alcohol or the alcohol per se or an amine. The salts resulting from the neutralization of the sulphonated crosslinked vinyl aromatic polymer may be removed from the polymer by treatment with a $C_{1-4}$ alkanol/water mixture. The process may comprise suspending and/or washing the neutralized sulphonated crosslinked polymer with a $C_{1-4}$ alkanol. The $C_{1-4}$ alkanol should be at least 50, preferably greater than 70 weight % for if too much water is present in the alkanol it will swell the polymer and cause problems with drying the sulphonated crosslinked vinyl aromatic polymer. Preferred alkanols include methanol, ethanol and propanol.

The resulting sulphonated crosslinked vinyl aromatic polymer may then be dried using conventional means and conditions. For example the material may be dried at relatively low temperatures, up to about 50° C., over desiccating agents or the sulphonated polymer may be dried at higher temperature from about 60 to 100° C., optionally under reduced pressure. The dried polymer may be in granular form or as a fine powder.

The degree of crosslinking of the polymer should be controlled so that the degree of sulfonation is greater than 90%. The sulphonated polymer should have a water up take of at least 150 g, preferably 350 g most preferably not less than 500 g of water per gram of polymer.

As noted above there may be instances where the particle size distribution will result in very close packing and the water may not penetrate into the bulk of the polymer. Generally, the particle size distribution of the polymer particles should be such that there are voids between the particles. Such a particle size distribution will result in a bulk density of the polymer as measured by ASTM D 1895 being less than 0.8, preferably from 0.25 to 0.7 g/cc. The bulk polymer may also be ground to obtain such a bulk density. For cable jacketing applications the particle size should be such that the particles will pass through a 40 mesh sieve. Preferably the particle are further sieved so that they will not pass through a 60 mesh sieve. This is corresponds to a particle size of less 0.25 mm and preferably greater than to 0.42 mm (0.0097–0.0164 inches). This particle size lends to cause the polymer to rapidly swell at the polymer/water interface and seal areas of water penetration.

As noted above the polymers of the present invention will also have a fast swell rate in dilute salt solutions, such as sea water. Specifically the polymers will swell to twice their volume in the presence of an excess of water or about a 3% solution of NaCl in less than 30 seconds. Preferably the polymers of the present invention will swell to twice their volume in less than about 15 seconds, most preferably less than about 10 seconds.

In some instances the swell rate of the polymer may be increased by mixing with the polymer from about 1 to 5 preferably from 1 to 3 weight % of one or more sodium salts. Useful salts include sodium sulphate. Without being bound by theory it is believed that the small cation such as sodium may tend to interfere less with the surface hydration of the particle and results in faster swelling of the polymer. Rapid surface hydration of the polymer causes rapid surface swell of the polymer and "block". That is the polymer surface swells and seals the surface so water or fluid won't penetrate into the interior of the polymer.

The polymers of the present invention may be used in the form of a multi-layered web. Generally the polymer will be distributed between a backing and a face web. At least one of the backing and face web must be permeable to water. In some applications both the backing and face web may be permeable. The webs may be nonwoven webs. The webs may comprise natural fibre such as cellulose or synthetic fibre such as polyesters such as polyethylene terephthalate or polybutylene terephthalate, polyamides such as nylons (e.g. a homopolymer of a cyclic amide of a carboxylic acid such as caprolactam (nylon 6) or a copolymer of a $C_{4-8}$ dicarboxlyic acid and a $C_{4-6}$ diamine such as a copolymer of hexamethylene diamine and adipic acid (nylon 66)) or a homopolymer of an aminocarboxylic acid such as alpha, omega-undecane aminocarboxylic acid (nylon 11) or a polyolefin such as polyethylene or polypropylene. It is also possible to prepare a slit web or sheet of the above material which may be used as a facing or backing web. The application weight of the polymer or polymer salt mixture in the web will depend on the contemplated use of the web. For example, in an application where large amounts of water may be encountered, it is not possible to replace the web and the surrounding environment will support the water swollen polymer, such as in geomembranes for road construction or as a barrier around the substructure of a building relatively high weights of polymer per square meter may be used. In applications where the amount of fluid is low and the web is easily replaced, the weight of polymer may be relatively low. Similarly if the potential for the presence of fluid is low and the amount of fluid is expected to be low the amount of polymer may be relatively low. The weight of polymer or polymer and salt may range from 0.001 to about 10, preferably from 0.01 to less than 5 most preferably from 0.1 to 1.0 pounds per square meter.

The webs may be prepared using conventional techniques which are known to those in the art of manufacturing webs. Additionally an adhesive backing may be applied to one surface of the web to hold the web in place when it laid up against a substrate such as a building substructure or the core of a cable. The resulting web may be slit into a tape having a relatively narrow dimension. In the manufacture of jacketed cables the tape may be wound about one or several members of the interior of the cable. It may not be necessary to wind the tape along the entire width of the cable. Rather, the tape could be wound about at regular intervals of the cable to act as a barrier to prevent moisture from travelling along the entire length of the cable should a portion of the cable jacket become cut or broken. Such a use of a tape of the polymer or a composition of the polymer and a salt will minimize the length of section of cable which may require replacement should a cable become cut or broken.

The following examples are intended to illustrate the invention and not to limit the invention. In the examples unless otherwise specified parts are parts by weight (g).

EXAMPLE 1 -DEMONSTRATION EXPERIMENT

A monomer mixture comprising 99.7 parts of styrene and 0.3 parts of divinylbenzene was free radical suspension polymerized. The resulting polymer was swollen in dichloroethane for two hours at room temperature. The resulting swollen polymer was then sulphonated using a mixture of sulphur trioxide and triethyl phosphate in a weight ratio of 2:3 in an amount to provide one sulphate group per aromatic ring in the polymer. The resulting polymer was neutralized with NaOH, washed in methanol and dried over night at room temperature over a sequestering agent. The resulting polymer was in the form of a white powder having a small uniform particle size distribution.

Small amounts of polymer were swollen with water to determine the total water uptake of the polymer. The water uptake was in the range from 250 to 300 g per gram of water.

The bulk density of the polymer was measured and found to be about 0.8 g/cc.

A 1 g sample of the polymer was placed in the bottom of a test tube 2 g of water were added to the test tube and the swell rate of the polymer was measured. The sample failed to swell to twice its volume in one minute. It took about 3 minutes for the polymer to swell to twice its volume. During the test observation of the bottom of the sample showed that the top layer of polymer had expanded to significantly retard the penetration of water to the bottom of the test tube. The polymer "failed" to pass the swell test because it was too good a water blocking agent and did not permit water to enter the interior of the sample. This demonstrates the need to have a high surface area available during the last procedure.

TEST PROCEDURES

Determination of Fluid Absorption

A 0.05 g sample of polymer as weighed on an analytical balance into a 50 cc graduated cylinder. Fifty (50) cc of a fluid (either 3% NaCl or distilled water) is added to the cylinder and allowed to stand for 1 hour. The content of the cylinder is poured into a 3" 120 mesh sieve and allowed to drain. The weight of the swollen polymer is determined. Absorption is the weight of the swollen polymer/weight of the dry polymer.

Swell Rate

In this test because the polymer swells rapidly, it is important to have a large surface area of polymer exposed to the moisture. To ensure proper wetting of sample, the ratio of the diameter of the container to the sample height should be not less than 2:1. The weight of the sample, depending on the bulk density is selected so that the proper diameter to height ratio is obtained. There are two procedures which may be used. These are set forth below:

1. Test Tube Test Procedure In a $\frac{1}{2} \times 3''$ test tube is placed a 0.5 g sample with the appropriate particle size. The tube is tapped lightly and height of sample marked 1 cc of liquid either 3% NaCl or water is added with a syringe at a rate which does not drastically disturb the surface of sample. The time to gelation (2×volumn) is recorded with stop watch. The ratio of test tube diameter to sample height is at least 2/1. Depending on the bulk density the weight of sample is chosen to meet this requirement. The ratio of liquid to sample is 2/1 as well.

2. Beaker/Jar Test. Approximately 10 g sample is placed in 2 inch diameter container. The container is tapped and the sample is covered with a light weight plate of slightly smaller diameter containing holes. Twenty cc of liquid either 3% NaCl or water is added and the time to reach two times is volume is measured. The ratio of diameter of container to sample thickness should be a minimum of 8/1. The sample weight is adjusted (depending on bulk density) so that this criteria is meet. The liquid weight is always twice that of the sample.

Example 1

A sample of polymer was prepared in a manner similar to that in Example 1. However, the sulphonated gel was not washed in methanol and the resulting polymer had a coarser particle size.

The water uptake of the polymer was measured by swelling the resulting polymer and determining the amount of water which the polymer could hold. The water uptake was 975 parts of water per part of polymer. The fluid uptake of a 3% NaCl solution was 66 g per gram of polymer and the fluid uptake of a 200 ppm solution of $CaCl_2$ was 375 g per gram of polymer.

The polymer was not purified and contained $Na_2SO_4$ salts. The bulk density of the polymer and salt was measured using ASTM D 1895 and found to be about 0.3 g/cc. The particles were sieved to pass through a 40 mesh sieve but not a 60 mesh sieve. A 0.5 g sample of polymer was placed in the bottom of a test tube and 1 cc of water were added to the test tube and the time it took for the sample of polymer to swell to twice its volume was recorded. The time to swell to twice its volume was about 7 seconds. Clearly this material having a lower bulk density a coatset particle size distribution and a small amount of sodium in the polymer meets the swell test.

EXAMPLE 2

A sample of the above polymer was purified, washed in methanol and dried. The particle size was such that the particles would pass through a 40 mesh sieve but not a 60 mesh sieve. The sample was tested to determine its swell time in 3% NaCl using the test tube method and it was 4 seconds.

What is claimed is:

1. A cable for use in a wet environment comprising a jacket and one or more inner core components and at least one wrap or partial wrap of a web comprising a backing web, a face web and between said backing and said face a layer of an absorbent water block material consisting of a sulphonated lightly cross linked aromatic polymer selected from the group consisting of:
   (i) one, or more polymers selected from the group consisting of:
      (a) homo polymers of a $C_{8-12}$ vinyl aromatic monomers which are unsubstituted or substituted by $C_{1-4}$ alkyl radicals;
      (b) copolymers comprising from 10 to 40 weight % of a copolymer comprising 40 to 60 weight % of one or more $C_{8-12}$ vinyl aromatic monomers which are unsubstituted or substituted by a $C_{1-4}$ alkyl radical or a chlorine atom and from 60 to 40 weight % of one or more $C_{3-8}$ vinyl nitriles which have been grafted onto from 90 to 60 weight % of a homopolymer of one or more $C_{4-6}$ conjugated diolefins; and
      (c) copolymers comprising from 40 to 60 weight % of one or more $C_{8-12}$ vinyl aromatic monomers which are unsubstituted or substituted by a $C_{1-4}$ alkyl radical or a chlorine atom and from 60 to 40 weight % of one or more $C_{4-6}$ conjugated diolefins which copolymers have been cross-linked with a di-$C_{1-4}$ alkyl halo substituted aromatic compound which is unsubstituted or substituted by up to two $C_{1-4}$ alkyl radicals in the presence of a Lewis acid; and
   (ii) copolymers comprising from 97 to 99.95 weight % of one or more $C_{8-12}$ vinyl aromatic monomers which are unsubstituted or are substituted by a $C_{1-4}$ alkyl radical and from 3.0 to 0.05 weight % of one or more $C_{10-14}$ aromatic monomers which contain at least two copolymerizable bonds in particulate form having a particle size such that the particles of will pass through a 40 mesh sieve, a bulk density of not more than 0.8 g/cc, a water absorbency of not less than 150 g of water per gram of polymer determined by the ratio of the weight of polymer swollen with water for at least three minutes to the weight of dry polymer before contact with water, which polymer has a swell rate so that it will swell to twice its volume in both water and a 3% solution of NaCl in less than 30 seconds as determined by placing a sample of polymer in a half inch diameter test tube, the weight of the sample being selected so that in view of the bulk density of the polymer the ratio of the diameter of the test tube to the height of the sample of dry polymer is at least two to one, and introducing at least twice the weight of polymer of liquid and measuring the time for the volume of the polymer to double amount from 0.1 to 10 pounds per square meter.

2. A cable according to claim 1, wherein said inner core component comprises a cable capable of carrying electronic or fibre optics transmissions.

* * * * *